United States Patent [19]

Herget et al.

[11] Patent Number: 4,858,472
[45] Date of Patent: Aug. 22, 1989

[54] STRAIN MONITORING SYSTEM

[76] Inventors: Gerhard H. Herget, 85 Country Lane, Kanata, Ontario, Canada, K2L 1J4; Franz Kapeller, 927 Weston Drive, Ottawa, Ontario, Canada, K1G 1X1

[21] Appl. No.: 236,164

[22] Filed: Aug. 25, 1988

[30] Foreign Application Priority Data

Aug. 25, 1987 [CA] Canada ................................ 545258

[51] Int. Cl.$^4$ ................................................ G01B 7/16
[52] U.S. Cl. ................................. 73/784; 73/DIG. 1
[58] Field of Search .............. 73/784, DIG. 1, 862.59, 73/862.64; 166/216; 403/274, 367

[56] References Cited

U.S. PATENT DOCUMENTS

| 3,029,874 | 4/1962 | Turman | 166/216 X |
| 4,141,246 | 2/1979 | Randolph | |
| 4,159,641 | 7/1979 | Hawkes | 73/778 |
| 4,594,899 | 6/1986 | Henke et al. | 73/784 |

FOREIGN PATENT DOCUMENTS

| 142462 | 3/1960 | U.S.S.R. | 73/DIG. 1 |
| 474643 | 12/1975 | U.S.S.R. | 73/784 |
| 0659917 | 4/1979 | U.S.S.R. | 73/862.59 |

OTHER PUBLICATIONS

Geotechnical Instrumentation, Geokon, Inc. (1986), pp. 1-5.
Issues in Rock Mechanics, Proceedings Twenty-Third Symposium on Rock Mechanics, the University of California, Berkeley, CA, Aug. 25-27, 1982; pp. 836-845.
Class 42k, 45oz. No. 142462: Dynamometer.
L. G. Etkin (679890/25 dated 21.9.60).

Primary Examiner—Jerry W. Myracle

[57] ABSTRACT

A vibrating wire strain meter has a steel proving ring across the bore of which extends a taut wire. The outer surface of the proving ring has sloping or tapered grooves extending axially along the entire length of the ring. A pair of diametrically opposed wedges sloping at the same angle as the grooves are used to wedge the proving ring in a borehole. The tapered grooves provide positive guiding of the wedges such that the device can be positioned accurately and repeatably in relation to the borehole wall. Preferably, the wire extends across a diameter which is perpendicular to the diameter on which the grooves and wedges are located. A novel tool for inserting and withdrawing the strain meter is also described.

10 Claims, 4 Drawing Sheets

STRAIN MONITORING SYSTEM

BACKGROUND OF THE INVENTION

This invention relates to an improved vibrating wire strain meter and an installation/retrieval tool therefor.

Strain meters of this type are well known and generally involve the use of a metal sleeve across the bore of which is strung a taut steel wire. The wire can be caused to vibrate by means of an electromagnetic transducer which is also housed within the sleeve. The frequency of vibration depends among other things upon the length and tightness of the wire and thus frequency can be measured by the same transducer which causes the wire to vibrate. In use, the meter is mounted securely within a hole bored within the rock formation the movement of which is to be monitored. Movement of the rock formation causes deformation of the sleeve which causes the tightness of the wire to increase or decrease and hence the vibration frequency to increase or decrease. The frequency which is displayed on a remote readout unit is, therefore, a measure of the strain.

U.S. Pat. No. 4,159,641 (Hawkes), incorporated herein by reference, is typical of the kind of device which has been used in the past. Although the device described in that patent is a stress meter it is in fact measuring movement of rock formations and is, therefore, primarily a strain meter. The manner in which the metal sleeve or proving ring of Hawkes is secured within a borehole is by jamming a wedge assembly between a flattened top surface portion of the proving ring and the wall of the hole. Another important aspect of the Hawkes device is that the one end of the vibrating wire is located adjacent the flattened surface and the other end is located diametrically opposite that. In other words the ends of the wire more or less coincide with the areas of contact between the proving ring assembly and the borehole wall.

In common with other devices commonly in use the Hawkes device exhibits serious defects in operation the most significant of which is lack of accuracy or repeatability. In studies carried out by Richard Lingle and Philip H. Nelson and published in chapter 84 of Issues in Rock Mechanics published by the Society of Mining Engineers of the American Institute of Mining, Metallurgical and Petroleum Engineers, Inc., New York 1982 and incorporated herein by reference, it was concluded that this type of device "did not function well enough to provide reliable data on stress changes." The main problem seemed to be that the device was unduly sensitive to the manner in which it was seated within the borehole. The problem is so great that the same device reinstalled several times in the same place in the same hole gave entirely different readings. More particularly, deviations as great as ±20% from the manufacturer's calibration factor were found.

SUMMARY OF THE INVENTION

It is an object of the present invention to overcome this problem and provide a device having a much improved accuracy and repeatability.

According to a broad aspect, the invention provides a vibrating wire sensing unit for a strain monitoring system comprising a cylindrical proving ring having an axially extending bore, a taut wire extending across the bore and being secured at its two ends to the proving ring, means for mounting the proving ring within a borehole, the mounting means comprising a pair of wedges having a predetermined taper angle and a pair of diametrically opposed complementary grooves for respectively receiving the wedges, the grooves extending along the outer surface of the proving ring parallel to the bore axis from one end of the proving ring to the other, the grooves each becoming progressively deeper from the one end of the proving ring to the other at a slope angle substantially identical to that of the wedges, and electromagnetic transducer means contained in the bore, the transducer means being arranged to cause the wire to vibrate and to detect the frequency of vibration, which frequency is dependent upon forces transmitted to the proving ring via the wedges.

A primary feature of the invention is the provision of tapered grooves in the outer surface of the proving ring which provide positive guiding of the wedges. These grooves and wedges are, in practice, machined to great accuracy and the result is that the sensing unit can be positioned accurately and repeatably in relation to the borehole wall.

According to the broadest aspect of the invention, the wire need not extend across a diameter of the proving ring but could extend along a chord. However, preferably the wire extends across a diameter and, in a preferred embodiment this diameter is perpendicular to the diameter upon which the grooves are located. This tends to improve the accuracy further as the wire ends are removed from the points of contact of the wedges with the borehole wall so that any minor seating error would be lessened.

The invention also contemplates a novel tool for installing and retrieving the sensor unit which for cooperation with the tool would have radially outwardly extending projections. The tool comprises arms releasably engageable with the proving ring projections and releasably engageable with the narrow ends of the wedges, power means releasably engageable with the wide ends of the wedges while the arms engage the projections for driving the wedges along the grooves against the holding action of the arms whereby the wedges engage the wall of the hole with a predetermined seating pressure, the power means also being releasably engageable with the sensing unit while the arms engage the thin ends of the wedges for driving the proving ring against the holding action of the arms on the wedges whereby the wedges are disengaged from the wall of the hole.

DESCRIPTION OF THE PREFERRED EMBODIMENTS

Figure 1:
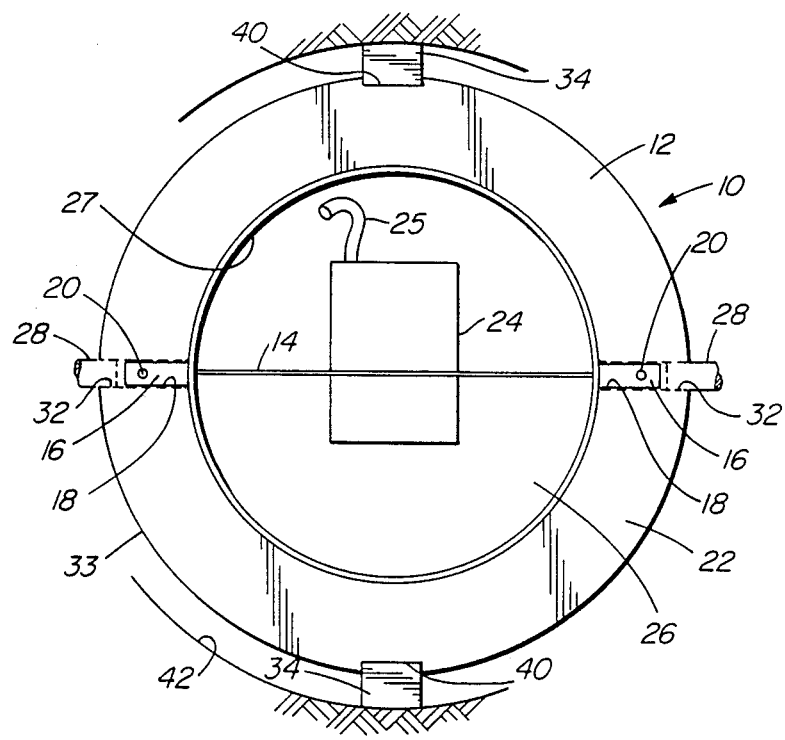
FIG. 1 is a view along the bore axis of a strain monitoring system sensing unit according to the invention installed in a borehole with parts of the sensing unit being omitted for clarity.
Figure 2:
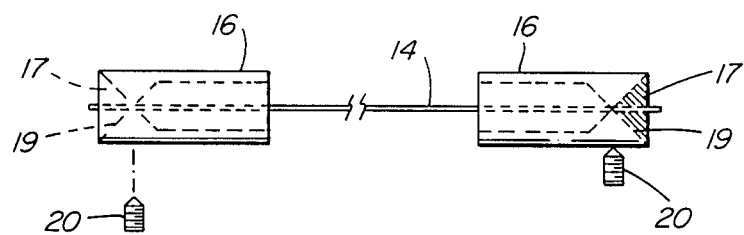
FIG. 2 is a schematic view illustrating a detail of the sensing unit of FIG. 1.
Figure 3:
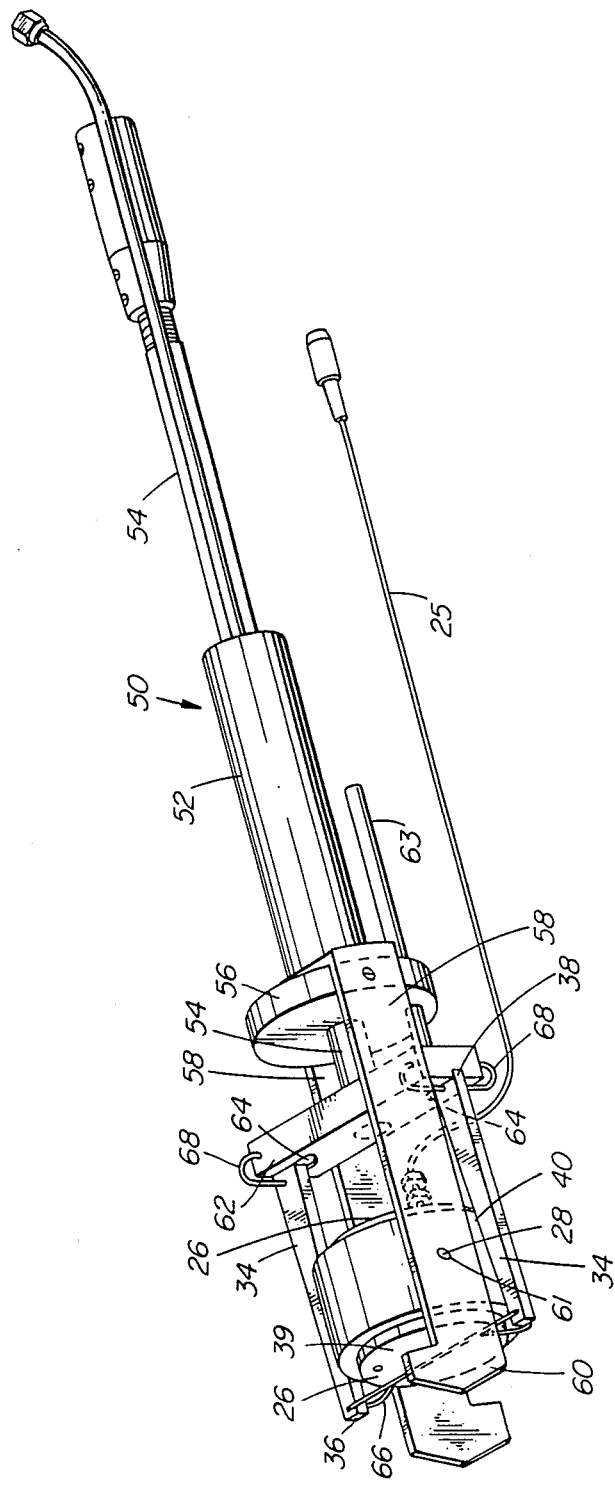
FIG. 3 is a perspective view illustrating installation of the sensing unit in a borehole by means of a special installation/retrieval tool.

Referring to FIGS. 1, 2 and 3, a sensing unit 10 for a strain monitoring system has, as a main component, a steel proving ring 12 across a diameter of which extends a taut steel wire 14. The wire 14 is secured to the proving ring 12 by means of two machined sleeves 16 which are soldered to opposite ends of the wire and received in radially extending bores 18. Attachment may also be made by mechanically clamping the wire through a spacer in the bore 18 against the wall of the proving ring 12. Respective set screws 20 extending inwardly of a face 22 engage and secure the sleeves 16. The tension of the wire 14 can be adjusted by adjusting the set screws 20. As can be seen particularly in FIG. 2 the wire mounting sleeves 16 are designed to maximize the unsupported length of the wire, by securing the wire near the outer ends of the sleeves by engagement of conical solder 17 with conical surfaces 19, while ensuring that the wire is not damaged during mounting.

An electromagnetic transducer 24 is mounted on the inner face of a steel cover plate 26 which is held in place in the bore of the proving ring 12 by means of a flexible 0-ring 27 and secured by two screws (not shown). As can be seen in FIG. 3, there is a metal cover plate 26 sealing each end of the bore of the proving ring 12 but in FIG. 1, one of the cover plates has been removed to expose the wire 14 and transducer 24. The transducer is connected to a remote readout unit (not shown) by means of a cable 25 which extends through a hole in one of the covers 26.

The transducer 24 is mounted in close proximity to the wire 14 and, in operation, emits electromagnetic pulses which cause the wire to vibrate and this vibration is then detected by the transducer, the frequency of vibration being determined by the tightness of the wire. As the transducer uses well known principles and does not in itself involve any inventive aspects, it will not be described in any more detail. Reference may be made for example to U.S. Pat. No. 4,159,641 (Hawkes) referred to above for further information on the principles of vibrating wire transducers. However, Hawkes contemplates a plucking system whereas the preferred embodiment of the present invention uses a continuous oscillation.

Provided in the proving ring and, in this embodiment, located generally on the same diameter along which the wire 14 extends is a pair of tapped holes 32 which accept studs 28 such that they extend radially outwardly from the circumferentially outer surface 33 of the proving ring 12. Studs 28 need not be aligned exactly on the same diameter as wire 14. These studs are used in the installation of the unit 10 in a borehole as will be described below.

Located on a diameter which extends at right angles to the diameter along which the wire 14 extends is a pair of wedges 34. As seen more clearly in FIG. 3, the wedges are identical, each being considerably longer than the axial dimension of proving ring 12 and tapering from a narrow end 36 which is located forwardly of the unit 10 to a broad end 38 which is located rearwardly of the unit 10. By "forwardly" is meant ahead of that end 39 of the unit 10 which is received first in the borehole. The angle of taper of the wedges 34 is preferably about 3° or less. Each wedge 34 is received in a respective groove 40 machined on the outer surface 33 of the proving ring 12, the groove extending parallel to the axial direction of the ring 12 and being tapered in the same way and to the same extent as the wedge. That is, the groove 40 is shallow adjacent forward end 39 of unit 10 and becomes progressively deeper towards the other end, the slope angle being the same as the taper angle of the wedge.

Figure 6:
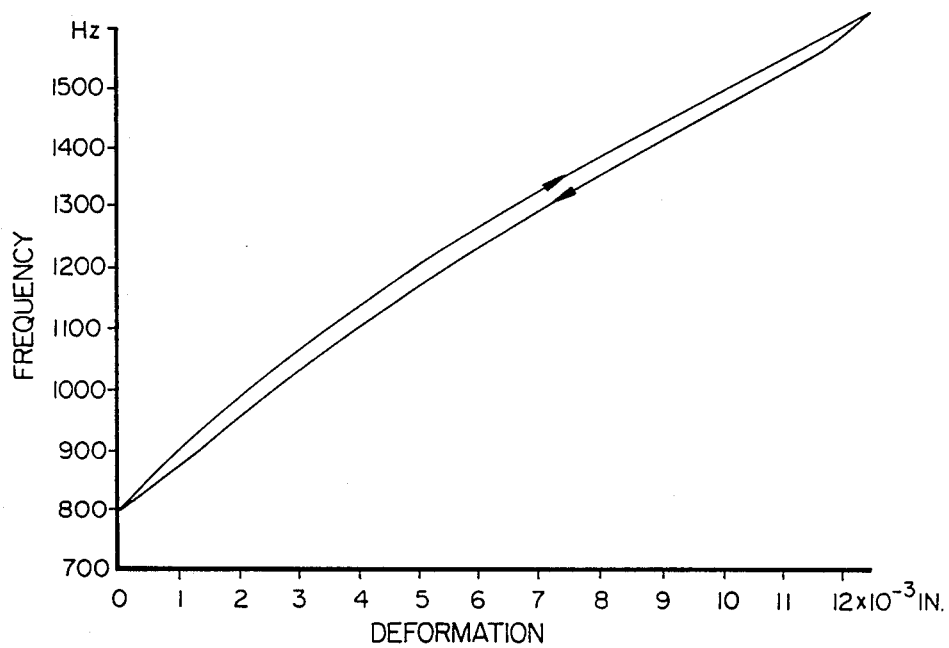
FIG. 6 is a graph of frequency against deformation for the strain monitoring system.

FIG. 1 shows the sensing unit 10 installed in a drill or borehole with the wedges 34 in firm contact with the wall 42 of the borehole. As indicated above, the frequency of vibration of wire 14 is determined by the tightness of the wire. Movement within the rock formation in which the hole has been bored will be transmitted through the wedges 34 to the ring 12 causing an increase or decrease in the tightness of wire 14 depending on the direction of movement and this is translated into a frequency change within the read-out unit which is essentially a self-contained frequency meter. Using calibration curves such as that illustrated in FIG. 6, the deformation corresponding to the frequency read-out can be obtained or the read-out unit could be adapted to give a direct reading of strain or deformation. In FIG. 6, the upper curve is used for measuring reduction of the borehole diameter caused by increased stress in the rock formation and the lower curve measures increase in the borehole diameter caused by decreased rock stress.

Referring now more particularly to FIG. 3, this shows an installation/retrieval tool 50 in the act of installing a sensing unit 10. The tool 50 consists of a hydraulic cylinder 52 and piston 54. The cylinder 52 is fitted with a pressure plate 56 from which extend in an axial direction away from the cylinder two diametrically oppositely located arms 58. The forward end portion of each arm 58 is increased in width to form a key 60 and near the key each arm has a through hole 61. The piston 54 passes through the pressure plate 56 and carries a push bar 62. A guide rod 63 having one end secured to push bar 62 extends parallel to piston 54 and passes through pressure plate 56. Guide rod 63 prevents rotation of push bar 62. The push bar 62 has two recesses 64 adapted to receive the wider end 38 of each wedge 34.

For installation of the unit 10, the arms 58 are rotated until holes 61 are aligned with holes 32 in the proving ring 12. Studs 28 which may consist of brass screws, lead pins or pop rivets (all of which are designed as shear pins) are then installed in holes 61 and 32 to maintain alignment of unit 10 with arms 58. The strength of the studs determines the seating pressure for the unit 10 and, depending on the seating pressure required, the diameter and the material of the studs is selected. Then the wedges 34 are fitted into the grooves 40 in the proving ring 12 with the forward ends 36 of the wedges interconnected by a wire loop 66. The rear ends 38 of the wedges are received in the push bar recesses 64 and held in place by a wire loop 68 extending between the wedges.

By means of a suitable centering tool and rods (not shown), the assembly of the sensing unit 10 and the tool 50 is pushed into the borehole to the required depth. Application of hydraulic pressure to the piston 54 moves the push bar 62 and the wedges 34 relative to the proving ring 12 until the borehole diameter is reached. Further increase of hydraulic pressure forces the wedges further along the grooves 40 to apply seating pressure to the proving ring 12. During this operation the read-out unit is connected to the transducer 24 and the amount of seating pressure can be observed as the sensing unit is actually being installed. When the required seating pressure is achieved, the studs 28 will be sheared and the installing tool 50 can be withdrawn leaving the sensing unit 10 behind.

Figure 4:
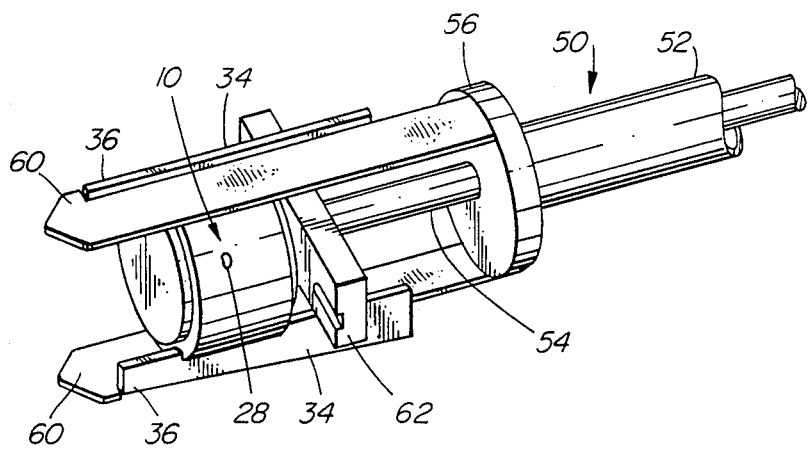
FIG. 4 is a fragmentary view of the tool shown in FIG. 3 illustrating the positions of parts of the tool relative to the sensing unit for retrieval of the sensing unit from a borehole.

After monitoring is complete, the same tool 50 is used for retrieval of the sensing unit. As shown in FIG. 4, the tool 50 is inserted into the borehole and then rotated until the arms 58 engage the wedges 34 with the keys 60 located forwardly of the ends 36 of the wedges. Then, piston 54 is extended forwardly and the push bar 62 engages one of the cover plates 26 of proving ring 12. While the keys 60 hold the wedges 34 in place the sensing unit 10 is pushed forwardly, i.e., inwardly, and this removes the wedging action of the wedges against the borehole wall allowing the assembly to be withdrawn.

Figure 5:
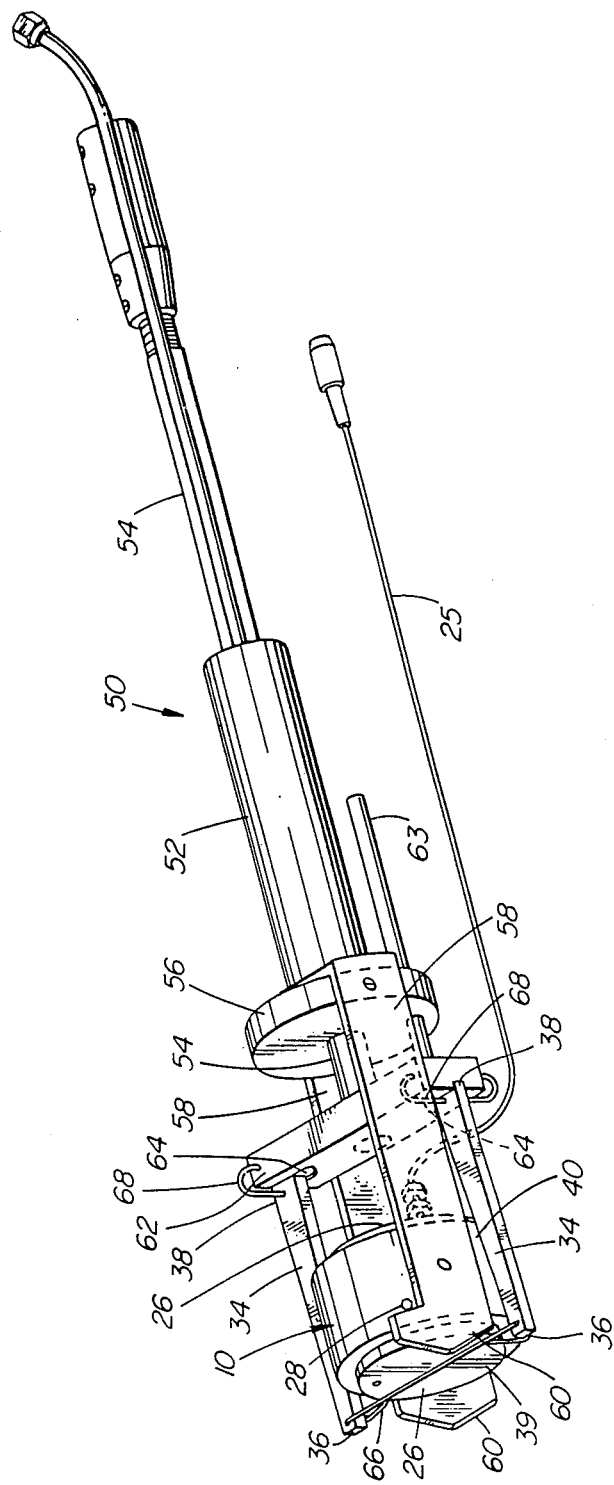
FIG. 5 is a view similar to FIG. 3 but illustrating a slightly modified version of the sensing unit.

In the embodiment described above the arms 58 are connected to the unit 10 via shear pins. In a modification, shown in FIG. 5, the studs 28' are not formed as shear pins and do not pass through holes in arms 58. Instead the studs are each formed with a head 30 which is adapted to engage releasably the key 60. FIG. 5 shows the relative positions of the keys and studs when the unit is being installed. In this case, shearing does not take place when the required seating pressure is achieved. It is necessary to retract the piston slightly and rotate tool 50 to free the keys 60 from studs 28' so that the tool can be withdrawn.

Retrieval of the modified sensing unit 10 is achieved in exactly the same way as for the sensing unit which has the shear pins.

The sensing unit of the present invention is intended for boreholes of 2 inch diameter and larger up to about 6 inches, with the vibrating wire being typically in the range 1.5 to 4 inches. The longer the wire length the lower the frequency at which the wire resonates and, therefore, the lower the stresses on the wire and the lower the electromagnetic forces required to vibrate the wire. Lowering of stresses on the wire in turn makes clamping of the wire less critical and reduces the incidence of creep in the wire. Given a wire thickness of about 0.01 the wire length should be chosen for an operating frequency of about 300 to 2400 Hz so as to achieve a resolution of 0.000003 in/in in a six inch borehole. The use of the conical steel sleeves and set screws permits the desirable maximization of the wire length while also allowing the wire tension to be set as required.

The use of the positively guided wedges permits the seating pressure on the sensing unit to be controlled easily to take advantage of the sensitivity of the vibrating wire for monitoring either increase or reduction of borehole diameter, i.e., a high seating pressure is selected for monitoring an increase in borehole diameter and a low seating pressure for monitoring a decrease in diameter. The grooves of the embodiment described are, as can be seen in FIG. 1, shaped in cross-section as rectangular channels with the underside of the wedges being complementarily shaped but other configurations sch as a V-shaped cross-section are feasible.

Although the wedges are preferably considerably longer than the grooves, particularly for ease in insertion and withdrawal, it is envisaged that wedges the same length or shorter than the grooves would also be workable.

Other modifications and improvements falling within the scope of this invention would occur to one of ordinary skill in the art.

What we claim as our invention is:

1. A vibrating wire sensing unit for a strain monitoring system, comprising:
    a cylindrical proving ring having an axially extending bore;
    a taut wire extending across the bore and being secured at its two ends to the proving ring;
    means for mounting the proving ring within a bore hole, the mounting means comprising a pair of wedges having a predetermined taper angle and a pair of diametrically opposed complementary grooves for respectively receiving the wedges, the grooves extending along an outer surface of the proving ring parallel to the bore axis from one end of the proving ring to the other, the grooves each becoming progressively deeper from one end of the proving ring to the other end at a slope angle substantially identical to that of the wedges; and
    electromagnetic transducer means contained in the bore, the transducer means being arranged to cause the wire to vibrate and to detect the frequency of vibration, which frequency is dependent upon movement transmitted to the proving ring via the wedges.

2. A vibrating wire sensing unit as claimed in claim 1, wherein the wire extends across a diameter or a cord.

3. A vibrating wire sensing unit as claimed in claim 2, wherein the diameter across which the wire extends is perpendicular to the diameter upon which the grooves are located.

4. A vibrating wire sensing unit as claimed in claim 1, wherein each groove is rectangular-channel-shaped in cross-section with the wedges each having a complementary mating surface.

5. A vibrating wire sensing unit as claimed in claim 1, wherein the wedges are longer than the grooves.

6. A vibrating wire sensing unit as claimed in claim 1, wherein the taper angle of the wedges and grooves is no more than 3 degrees.

7. A vibrating wire sensing unit as claimed in claim 1, wherein the wire is secured to the proving ring by means of sleeves secured to the two ends of the wire and set screws for engaging the sleeves and adjusting the wire tightness.

8. A vibrating wire sensing unit as claimed in claim 1, wherein the proving ring is provided with radially outwardly extending projections releasably engageable with an installation/retrieval tool for installing the sensing unit in a bore hole.

9. A vibrating wire sensing unit as claimed in claim 8, wherein the radially outwardly extending projections are shear pins arranged to shear at a predetermined seating pressure.

10. A vibrating wire sensing unit as claimed in claim 8, wherein the radially outwardly extending projections are non-shearable studs.

* * * * *